A. C. BAKER.
HARNESS LINES.
APPLICATION FILED JULY 2, 1912.
1,051,059.
Patented Jan. 21, 1913.
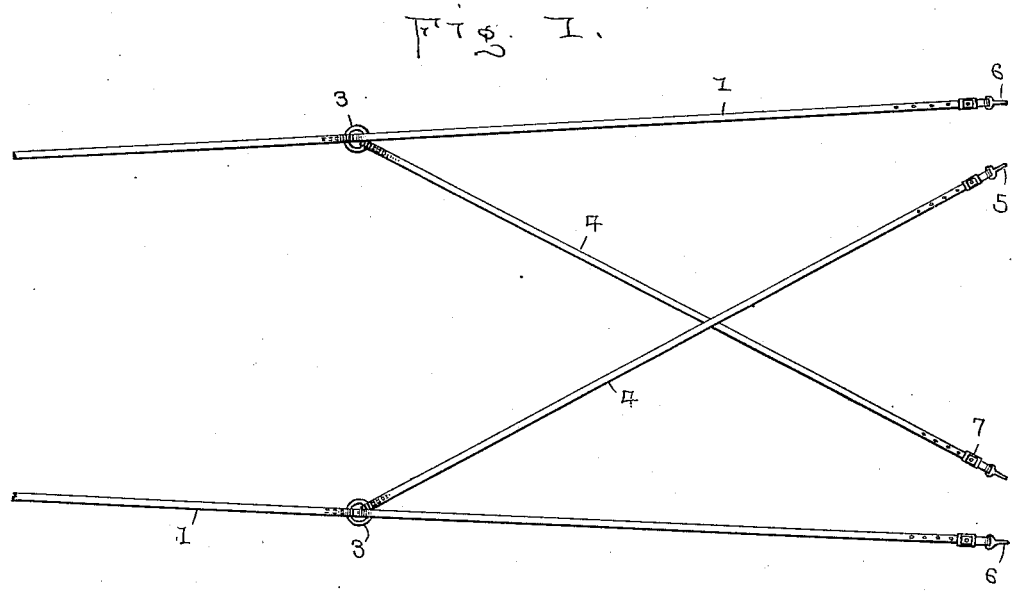
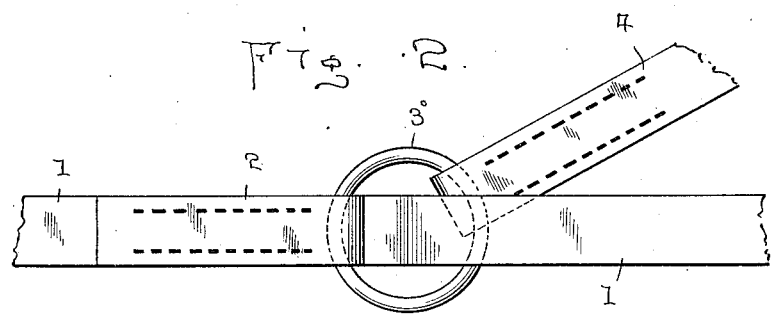
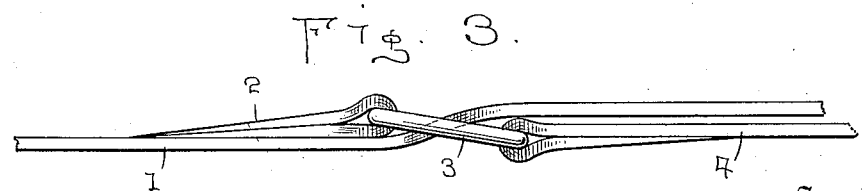

UNITED STATES PATENT OFFICE.

ALBERT CHRIS BAKER, OF PONCA, NEBRASKA.

HARNESS-LINES.

1,051,059.

Specification of Letters Patent.  Patented Jan. 21, 1913.

Application filed July 2, 1912. Serial No. 707,302.

*To all whom it may concern:*

Be it known that I, ALBERT CHRIS BAKER, a citizen of the United States, residing at Ponca, in the county of Dixon and State of Nebraska, have invented certain new and useful Improvements in Harness-Lines; and I do hereby declare the following to be a full, clear, and exact description of the invention, such as will enable others skilled in the art to which it appertains to make and use the same.

My invention relates to certain new and useful improvements in harness construction and more particularly to the construction of the driving lines, whereby I am able to dispense with the necessity of weakening the driving line incident to the use of a buckle carried by the line at the point of juncture with the check rein or auxiliary line extending from the main driving line across to the inner side of the opposite horse and my object therefore is to provide simple though efficient means to render it possible to avoid cutting holes in the main driving line at said point of juncture.

Other objects and advantages will be hereinafter clearly set forth and illustrated in the accompanying drawings, which are made a part of this application and in which,—

Figure 1 shows a top plan view of one side of driving lines commonly employed upon a double harness. Fig. 2 is a detail view showing the manner of connecting the auxiliary line to the main driving line, while, Fig. 3 is an edge view of Fig. 2.

In order to conveniently refer to the various parts of my invention, numerals will be employed, the same numeral applying to the corresponding part in the several views.

Referring to the numerals on the drawings, 1 indicates the main or driving line of proper length to reach from the outer side of the mouth of the outside animal to the driver, while 2 designates the anchoring means or loop for securing the ring 3 to the main line and to the said ring I secure permanently, as by stitching, the rear end of the auxiliary line 4, while the forward end reaches coextensive to the position occupied by the forward end of the main line and is provided preferably with a snap hook 5, corresponding to the snap hook 6 on the forward end of the main line. The snap hook may be attached to the said lines by a ring similarly anchored, as indicated by the numeral 3, or said snap hook may be connected in the usual way, as by the buckle 7, or equivalent means, which will render the length of said lines properly adjustable to engage with the bit of the animal. By providing the ring member 3, I am enabled to dispense with the usual form of buckle employed at this point and consequently, avoid the necessity of providing a plurality of holes in the main line at this point to render the length of the auxiliary line adjustable. By providing the ring member 3, I also avoid the possibility of having the lines engaging in the harness net at this point, as is common where buckles are used. The main line extends through the ring, so that the ring-engaging end of the line 4 is on the opposite side of the main line from the loop 2, and therefore, when the lines are pulled taut, the loop 2 is held snugly against the main line 1. By this arrangement, the danger of ripping the stitching, and thus displacing the loop, is reduced to the minimum. The ring also more readily passes through the back-band ring without catching thereon and thereby preventing the free use of the controlling lines. I am enabled therefore to dispense with the buckle and shield and the free end of the strap passing therethrough, inasmuch as the said strap causes great annoyance at times in engaging the back-band ring, as above stated. By this means I also utilize the full strength of the leather employed in the main line, as will be obvious. The adjustment of the auxiliary lines on the main line is attained by placing a buckle on the ends thereof to engage the snap hook, though ordinarily I prefer to employ rings at the forward ends also.

It will thus be seen that I have provided reliably efficient means for attaining the full strength of the main driving lines and at the same time making it possible to properly adjust the main or auxiliary lines to the accommodation of the animals and for attaining the best results and having thus described my invention, further description is deemed unnecessary.

What I claim is:

A main driving line having an anchoring loop fixedly secured thereon, a ring engaged by said loop, an auxiliary line engaged with the ring, and attaching means on the ends of the respective lines, said main line extending through the ring in such relation that the loop is drawn snugly against the main line when the lines are drawn taut.

In testimony whereof I have signed my name to this specification in the presence of two subscribing witnesses.

ALBERT CHRIS BAKER.

Witnesses:
 FRED JEFFREY,
 HERMAN DOW.

Copies of this patent may be obtained for five cents each, by addressing the "Commissioner of Patents, Washington, D. C."